(12) United States Patent
Liang

(10) Patent No.: US 8,484,715 B2
(45) Date of Patent: Jul. 9, 2013

(54) METHOD AND SYSTEM FOR NETWORK ACCESS AND NETWORK CONNECTION DEVICE

(75) Inventor: Ru Liang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 715 days.

(21) Appl. No.: 12/353,697

(22) Filed: Jan. 14, 2009

(65) Prior Publication Data

US 2009/0165091 A1 Jun. 25, 2009

Related U.S. Application Data

(63) Continuation of application No. PCT/CN2007/070311, filed on Jul. 18, 2007.

(30) Foreign Application Priority Data

Jul. 19, 2006 (CN) .......................... 2006 1 0061725

(51) Int. Cl.
*H04L 29/06* (2006.01)
(52) U.S. Cl.
USPC ............. 726/11; 726/3; 726/12; 726/14
(58) Field of Classification Search
USPC .................. 726/3, 11, 12, 14; 709/227, 228, 709/229
See application file for complete search history.

(56) References Cited

U.S. PATENT DOCUMENTS 6,708,219 B1 * 3/2004 Borella et al. ................ 709/245
7,228,131 B2 * 6/2007 Yokota et al. .............. 455/426.1
(Continued)

FOREIGN PATENT DOCUMENTS

| CN | 1326281 | | 12/2001 |
|----|---------|---|---------|
| CN | 1423452 | A | 12/2001 |

(Continued)

OTHER PUBLICATIONS

Lopez, Rafael Marin; Perez, Gregorio Martinez; Gomez Skarmeta, Antonio F.; "Implementing RADIUS and Diameter AAA Systems in IPv6-based Scenarios", 19th International Conference on Advanced Information Networking and Applications, Mar. 28-30, 2005, vol. 2, pp. 851-855.*

(Continued)

*Primary Examiner* — Carl Colin
*Assistant Examiner* — Victor Lesniewski
(74) *Attorney, Agent, or Firm* — Brinks Hofer Gilson & Lione

(57) ABSTRACT

A network access method and system and a network connection device are provided. A network connection device connected between a first network and a second network obtains first network attribute information about a first network device according to an access request for accessing the second network from the first network device on the first network. The network connection device performs authentication on whether the first network device has a right to access the second network based on the first network attribute information. If the authentication is passed, the network connection device connects the first network device into the second network. If the authentication is not passed, the network connection device prohibits the first network device from accessing the second network.

17 Claims, 7 Drawing Sheets

U.S. PATENT DOCUMENTS

| | | | |
|---|---|---|---|
| 7,277,453 B2* | 10/2007 | Chin et al. | 370/466 |
| 7,639,686 B2* | 12/2009 | Wetterwald et al. | 370/392 |
| 7,657,642 B2* | 2/2010 | Blanchet | 709/230 |
| 7,698,436 B2* | 4/2010 | Takusagawa et al. | 709/227 |
| 7,764,686 B1* | 7/2010 | Toebes et al. | 370/392 |
| 7,810,149 B2* | 10/2010 | Islam et al. | 726/11 |
| 8,139,571 B2* | 3/2012 | Khalil et al. | 370/389 |
| 8,184,641 B2* | 5/2012 | Alt et al. | 370/395.54 |
| 8,341,700 B2* | 12/2012 | Malinen et al. | 726/3 |
| 2004/0088385 A1* | 5/2004 | Blanchet et al. | 709/220 |
| 2004/0107287 A1* | 6/2004 | Ananda et al. | 709/230 |
| 2004/0136382 A1* | 7/2004 | Sundquist | 370/400 |
| 2004/0240468 A1* | 12/2004 | Chin et al. | 370/466 |
| 2005/0237983 A1* | 10/2005 | Khalil et al. | 370/338 |
| 2006/0046713 A1* | 3/2006 | Yokota et al. | 455/426.1 |
| 2006/0062248 A1* | 3/2006 | Huang et al. | 370/466 |
| 2006/0104226 A1* | 5/2006 | Ahn | 370/315 |
| 2006/0215657 A1* | 9/2006 | Lee et al. | 370/389 |
| 2006/0248202 A1* | 11/2006 | Blanchet et al. | 709/227 |
| 2006/0259641 A1* | 11/2006 | Kim et al. | 709/245 |
| 2007/0189255 A1* | 8/2007 | Navali et al. | 370/338 |
| 2007/0211729 A1* | 9/2007 | Yoshiba et al. | 370/395.52 |

FOREIGN PATENT DOCUMENTS

| | | |
|---|---|---|
| CN | 1423452 | 6/2003 |
| CN | 1529480 | 9/2004 |
| JP | 2005-328407 | 11/2005 |

OTHER PUBLICATIONS

Engelstad, Paal; Haslestad, Thomas; Paint, Frederic; "Authenticated Access for IPv6 Supported Mobility", Eighth IEEE International Symposium on Computers and Communication, Jun. 30-Jul. 3, 2003, vol. 1, pp. 569-575.*

Narten, T. et al. "Neighbor Discovery for Ip Version 6 (IPv6)" The Internet Society. (Dec. 1998):1-83.

Rigney, C. et al. Remote Authentication Dial in User Service (Radius). The Internet Society. (Jun. 2000):1-68.

Templin, F. et al. "Intra-site Automatic Tunnel Addressing Protocol (ISATAP) Draft-ietf-ngtrans-isatap-24.txt." The Internet Society. (Jan. 27, 2005): 1-16.

Templin, F. et al. Intra-site Automatic Tunnel Addressing Protocol (ISATAP). The Internet Society (Oct. 2005):1-13.

Written Opinion of the International Searching Authority issued in corresponding PCT Application No. PCT/CN2007/070311; issued Jan. 20, 2009.

Office Action issued in corresponding Chinese Patent Application No. 200610061725.7; issued Feb. 20, 2009.

International Search Report Issued in corresponding PCT Application No. PCT/CN2007/070311; mailed Oct. 11, 2007.

* cited by examiner

```
0-1-2-3-4-5-6-7-0-1-2-3-4-5-6-7-0-1-2-3-4-5-6-7-0-1-2-3-4-5-6-7
1   Type          Length             Value
```

METHOD AND SYSTEM FOR NETWORK ACCESS AND NETWORK CONNECTION DEVICE

CROSS REFERENCES TO RELATED APPLICATIONS

The application is a continuation application of PCT/CN2007/070311, filed on Jul. 18, 2007, and entitled "METHOD AND SYSTEM for NETWORK ACCESS AND NETWORK CONNECTION DEVICE", which claims priority to the Chinese Patent Application No. 200610061725.7, filed on Jul. 19, 2006, and entitled "NETWORK ACCESS METHOD", both of which are incorporated herein by reference in their entirety.

BACKGROUND OF THE DISCLOSURE

1. Field of the Technology

The present disclosure relates to a network access technology of a communication field, and more particularly to a network access method and system and a network connection device.

2. Background of the Disclosure

The interconnection technology between Internet Protocol (IP) networks has been developed greatly. For example, in the initial period of the transition from Internet Protocol version 4 (IPv4) to Internet Protocol version 6 (IPv6), the IPv4 network has been widely deployed, while the IPv6 network is distributed at different corners of the world and therefore has effectively been confined to some "isolated islands". To realize the IPv6 network interconnection, dedicated lines can be used to interconnect the IPv6 isolated islands, which, however, is apparently uneconomical. Therefore, the tunnel technology is often utilized to create tunnels on the IPv4 network to realize the network interconnection of the IPv6 isolated islands. The tunnels established on the IPv4 network for connecting the IPv6 network are referred to as IPv6 over IPv4 tunnels.

The existing IPv6 over IPv4 tunnel technology will be described briefly as follows.

A first and a second border router must start the IPv4/IPv6 dual protocol stacks. After receiving a message from the first IPv6 network side, if the destination of the message is not the first border router, the first border router regards the received IPv6 message as a load, and adds an IPv4 message header to the received IPv6 message, that is, encapsulates the received IPv6 message in an IPv4 message. In the IPv4 network, the encapsulated tunnel message is transmitted to a peer second border router through an IPv6 over IPv4 tunnel. The peer second border router decapsulates the received tunnel message to remove the IPv4 message header, and forwards the decapsulated IPv6 message to the peer second IPv6 network.

It is known that network based on the IPv4 protocol and the network based on the IPv6 protocol can be interconnected through the tunnel technology. Based on the basic tunneling technology, an automatic network interconnection tunneling technology, namely, the Intra-site Automatic Tunnel Addressing Protocol (ISATAP) tunneling technology, is provided to enable IPv4/IPv6 hosts in the IPv4 network to access the IPv6 network.

The ISATAP tunneling is an automatic IPv6 over IPv4 tunneling technology which establishes ISATAP tunnels between the IPv4/IPv6 hosts (which can access both the IPv4 and IPv6 networks) supporting the ISATAP and ISATAP routers such that the IPv4/IPv6 hosts in the IPv4 network can access the IPv6 network.

The principles of the ISATAP tunneling technology will be described briefly in the following.

When an ISATAP tunnel is established, the IPv6 address must be in the ISATAP format, which has the following structure:

IPv6 Prefix (64 bits)::0000:5EFE:IPv4-Address.

When an IPv4/IPv6 host on the IPv4 network uses an IPv6 link-local address in the ISATAP format to send a router request message to the ISATAP router, the router request message must be encapsulated in an IPv4 message before the router request message is sent to the ISATAP router. The ISATAP router uses a router notification message to respond to the router request. The router notification message includes prefix information about a global address of an IPv6 network. The IPv4/IPv6 host combines the prefix provided by the ISATAP router and 5EFE:IPv4-Address so as to obtain the global address of the IPv6 network of the host, and uses the global address of the IPv6 network to access the IPv6 network, and further to access an IPv6 host on the IPv6 network.

It is known from the previous description that the ISATAP tunneling can be used to enable a great number of host users on the IPv4 network to access the IPv6 network. In the application environment in the initial period of the IPv6 network when the IPv4 network is dominant, a great number of scattered IPv4 hosts can access the ISATAP routers, which are also referred to as ISATAP gateways, through the ISATAP tunnels, thereby realizing the access to the IPv6 network.

For the network interconnection technology based on different protocols, it is vital to maintain the security of network access. An authentication mechanism must be used to control which users of the Ipv4 hosts can access the IPv6 network through the ISATAP tunnels. Otherwise, the ISATAP accessing mode cannot be applied in the large-scale deployment and operation supervision.

The aforementioned ISATAP gateway has an authentication, authorization, and accounting (AAA) mechanism which provides a uniform framework for configuring the three security functions of authentication, authorization, and accounting. The AAA realizes the network security through access control in the following aspects such as which users can access the network, which services a user with the access right can obtain, and how to perform the accounting for a user using network resources.

The authentication of the AAA includes local authentication and remote authentication.

In the local authentication, the user information (including the user name, password, and other attributes of a local user) is configured on an access server. The local authentication has a high speed and can reduce the operational cost.

The local authentication can locally configure attributes such as the address pool, user name, password, DNS server address, and WEB authentication server address on the access server. These attributes can be used to authenticate the user information directly.

In the remote authentication, the authentication is performed through authentication protocols and a remote authentication server. The most commonly used protocol is the Remote Authentication Dial In User Service (RADIUS) protocol or the Terminal Access Controller Access Control System (TACACS) protocol. When a user intends to establish a connection with an access server through a network so as to obtain the right to access another network or the right to use some network resources, the access server authenticates the user or the corresponding connection. The access server is responsible for transferring the authentication information of the user to the RADIUS or TACACS server. The RADIUS or TACACS protocol specifies how to transfer the user information and charging information between the access server and the RADIUS or TACACS server. The RADIUS or TACACS server receives a connection request of the user, completes the authentication, and returns the configuration information required by the user to the access server.

Normally, an access protocol predefines the authentication attributes. For example, in a message based on the Radius protocol, the attribute format for transferring the user information is as shown in FIG. 1 in which the Type value may be User-Name, User-Password, CHAP-Password, NAS-IP-Address, NAS-Port, Service-Type, Framed-Protocol, Framed-IP-Address, Framed-IP-Netmask, Framed-Routing, Filter-Id, Framed-MTU, Framed-Compression, Login-IP-Host, Login-Service, or Login-TCP-Port. The data having different Type values represents the corresponding authentication information. Currently, an authentication technology for the ISATAP tunneling access is realized through a captive Portal authentication on the access network (corresponding to the IPv4 network) which is an indirect network access authentication method. The Portal is a common authentication technology in which a Portal authentication server must be set on the access network (corresponding to the IPv4 network). Thus, when the user accesses the Internet, the user can use a standard WWW browser to access the Portal server, a Web server implements the user authentication according to characteristic information of the user on the IPv4 network (for example, the IPv4 network address of the user), and the user can perform the authentication and select relevant services on WWW pages. Only the access network hosts (corresponding to the IPv4/IPv6 hosts on the IPv4 network) passing the authentication of the Portal authentication server can access network connection devices such as the access gateway (corresponding to the ISATAP router), so as to obtain the global address prefix of the network to be accessed returned by the network connection device. Thus, the access network hosts can access the network to be accessed (corresponding to the IPv6 network).

If the previous access network authentication method is used to enable the IPv4/IPv6 hosts on the IPv4 network to access the IPv6 network to be accessed through the ISATAP tunnels, a Portal authentication service must be set in the IPv4 network which causes additional limits to the networking.

To prevent the additional limits to the networking because the Portal authentication service must be set in the access network, another authentication method using the tunneling technology to access the network is also provided in the prior art which is based on the pure network protocol authentication on the network to be accessed (corresponding to the IPv6 network). In detail, an IPv4/IPv6 host on the IPv4 network firstly accesses an ISATAP router and obtains the global address of the IPv6 network according to the global address prefix of the IPv6 network returned by the ISATAP router. Then, the layer 3 authentication technology on the IPv6 network is used to authenticate the global address of the IPv6 network of the IPv4/IPv6 host. If the authentication is passed, the IPv4/IPv6 host can access the resources on the network to be accessed (the IPv6 network). Though the Portal authentication server does not need to be set in the IPv4 network according to this authentication method, as the authentication method is based on the authentication of the global address of the IPv6 network of the host requiring to access the IPv6 network, when this technical solution is used, the global address of the IPv6 network must be assigned to the host requiring to access the IPv6 network before the authentication. That is, the IPv4/IPv6 hosts on the IPv4 network can obtain their global addresses of the IPv6 network even if the hosts cannot pass the authentication on the IPv6 network, resulting in potential risks to the network security.

SUMMARY OF THE DISCLOSURE

Accordingly, embodiments of the present disclosure provide a network access method and system and a network connection device which do not need an additional authentication device on an access network and do not cause potential risks to network security because global addresses on a network to be accessed do not need to be assigned to users before authentication.

An embodiment of the present disclosure provides a network access method which includes the following steps. A network connection device connected between a first network and a second network obtains first network attribute information about a first network device according to an access request for accessing the second network from the first network device on the first network. The network connection device performs authentication on whether the first network device has a right to access the second network based on the first network attribute information. If the authentication passes, the network connection device connects the first network device to the second network. If the authentication is not passed, the network connection device prohibits the first network device from accessing the second network.

An embodiment of the present disclosure further provides a network connection device connected between a first network and a second network. The device includes an access request processing unit, an authentication processing unit, and an access processing unit. The access request processing unit is adapted to obtain a first network attribute information about a first network device based on an access request for accessing the second network from the first network device on the first network. The authentication processing unit is adapted to perform authentication on whether the first network device has a right to access the second network based on the first network attribute information provided by the access request processing unit. The access processing unit is adapted to connect the first network device to the second network when an authentication result provided by the authentication processing unit indicates that the authentication is passed and prohibits the first network device from accessing the second network when the authentication result indicates that the authentication is not passed.

An embodiment of the present disclosure further provides a network access system which includes a first network, a second network, and a network connection device connected between the first network and the second network. The network connection device includes an access request processing unit, an authentication processing unit, and an access processing unit. The access request processing unit is adapted to obtain first network attribute information about a first network device based on an access request for accessing the second network from the first network device on the first network. The authentication processing unit is adapted to perform authentication on whether the first network device has a right to access the second network based on the first network attribute information provided by the access request processing unit. The access processing unit is adapted to connect the first network device to the second network when an authentication result provided by the authentication processing unit indicates that the authentication is passed and prohibits the first network device from accessing the second network when the authentication result indicates that the authentication is not passed.

An embodiment of the present disclosure further provides a network access system which includes a first network device and a network connection device. The first network device is disposed in a first network based on a first network protocol. The network connection device is connected between a second network based on a second network protocol and the first network, and the first network device is connected to the network connection device through the first network. An authentication processing unit is disposed in the network connection device.

After the network connection device receives an access request for accessing the second network from the first network device, the authentication processing unit perform authentication on whether the first network device has a right to access the second network. If the authentication is passed, the first network device accesses the second network through the network connection device. If the authentication is not passed, the network connection device prohibits the first network device from accessing the second network.

An embodiment of the present disclosure further provides a network access system which includes a first network device and a network connection device. The first network device is disposed on a first network based on an IPv4 protocol. The network connection device is connected between a second network based on an IPV6 protocol and the first network, and the first network device is connected to the network connection device through the first network. An authentication processing unit is disposed in the network connection device.

After the network connection device receives an access request to an IPv6 link local address containing an IPv4 address of the first network device from the first network device, the network connection device extracts and obtains the IPv4 address of the first network device. The authentication processing unit perform authentication on whether the first network device has a right to access the second network according to the IPV4 address. If the authentication is passed, the first network device accesses the second network through the network connection device. If the authentication is not passed, the network connection device prohibits the first network device from accessing the second network.

It is known from the technical solutions according to the embodiments of the present disclosure that the network connection device according to the embodiments of the present disclosure authenticates the first network attribute information about the first network device on the first network such that first network device cannot obtain the global address based on the second network protocol before the authentication is passed, which reduces the potential risks to the security of the access network.

BRIEF DESCRIPTION OF THE DRAWINGS

The present disclosure will become more fully understood from the detailed description given herein below for illustration only, and thus are not limitative of the present disclosure, and wherein.

DETAILED DESCRIPTION OF THE EMBODIMENTS

According to an embodiment of the present disclosure, a network connection device connecting a second network based on a second network protocol and a first network based on a first network protocol receives an access request for accessing the second network from a first network device and performs authentication on whether the first network device has a right to access the second network. Thus, the first network device can access the second network through the first network.

Implementations of a network access method and system, a network connection device, and a communication system of the present disclosure will be described in detail in the following with reference to the accompanying drawings.

Figures 1, 2:
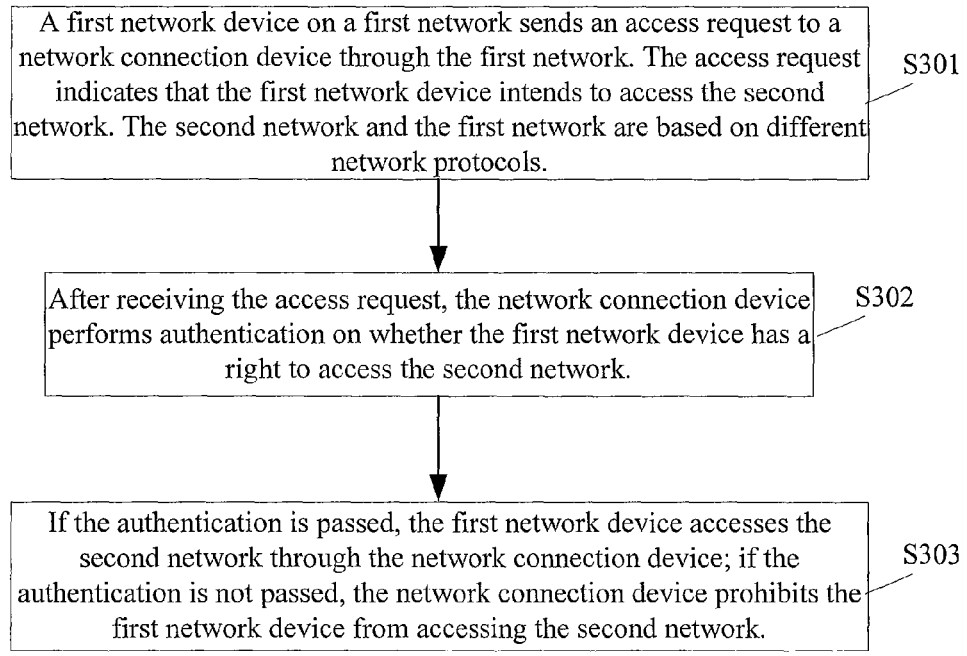
FIG. 1 is a schematic view of the attribute format for transferring the user information in a Radius protocol message in the prior art.
FIG. 2 is a schematic flow chart of a network access method according to a first embodiment of the present disclosure.

Firstly, the present disclosure provides a first embodiment of a network access method. As shown in FIG. 2, the network access method according to the first embodiment includes the following steps.

In Step S301, a first network device on a first network sends an access request to a network connection device through the first network. The access request indicates that the first network device intends to access the second network. The second network and the first network are based on different network protocols.

In Step S302, after receiving the access request, the network connection device performs authentication on whether the first network device has a right to access the second network.

In Step S303, if the authentication is passed, the first network device accesses the second network through the network connection device, and if the authentication is not passed, the network connection device prohibits the first network device from accessing the second network.

Figure 3:
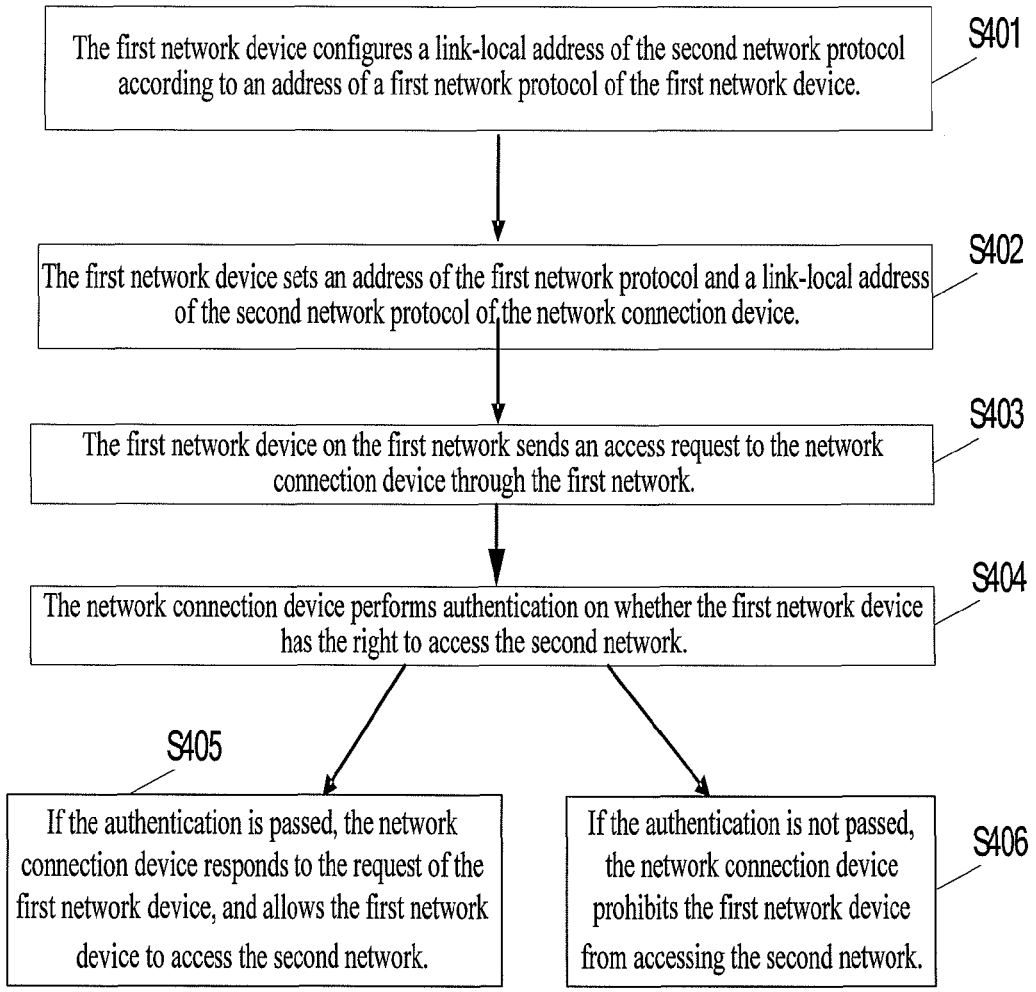
FIG. 3 is a schematic flow chart of a first implementation of the network access method according to the first embodiment of the present disclosure.

FIG. 3 is a schematic flow chart of a first implementation of a network access method according to a first embodiment of the present disclosure.

In Step S401, the first network device configures a link-local address of the second network protocol according to an address of a first network protocol of the first network device.

The first network device manually configures or statelessly autoconfigures the link-local address of the second network protocol. The link-local address includes the address of the first network protocol of the first network device.

In Step S402, the first network device sets an address of the first network protocol and a link-local address of the second network protocol of the network connection device.

Before sending a request to the network connection device, the first network device needs to obtain the address of the network connection device. After configuring the link-local address of the second network protocol of the first network device, the first network device further sets the address of the first network protocol of the network connection device and sets the link-local address of the second network protocol of the network connection device to be accessed according to the address of the first network protocol of the network connection device. The link-local address is used as a source address of subsequent requests.

It should be noted that Steps S401 and S402 may be performed in a reversed sequence.

In Step S403, the first network device on the first network sends an access request to the network connection device through the first network.

The first network device on the first network sends the access request to the network connection device according to the link-local address of the second network protocol of the network connection device through the first network. The access request includes the link-local address of the second network protocol containing the address of the first network protocol of the first network device. The link-local address of the second network protocol is also referred to as a source address of the second network protocol. The access request may be sent to the network connection device as a router request message.

In Step S404, the network connection device performs authentication on whether the first network device has the right to access the second network.

After receiving the access request, the network connection device extracts the source address of the second network protocol and performs authentication on whether the first network device has the right to access the second network according to the address of the first network protocol of the first network device in the source address. The authentication methods include local authentication of the first network device or remote authentication through a remote authentication server. The network connection device connects the second network based on the second protocol and the first network based on the first protocol. That is, the network connection device is connected between the second network and the first network. The network connection device includes, but not limited to, a gateway or router receiving the access request sent by the first network device and performing authentication on whether the first network device can access the second network.

In Step S405, if the authentication is passed, the network connection device responds to the request of the first network device and allows the first network device to access the second network.

In detail, if the authentication is passed, the network connection device responds to the first network device with the prefix information about a global address of the second network protocol. Thus, the first network device can generate its global address of the second network protocol according to the obtained prefix information about the global address of the second network protocol and the link-local address of the second network protocol. Then, the first network device encapsulates a data message of the second network protocol (including the global address of the second network protocol) with a header of the first network protocol and sends it to the network connection device through an ISATAP tunnel. After the network connection device decapsulates the header of the first network protocol in the outer layer, the data message of the second network protocol sent by the first network device is obtained. Next, the data message is forwarded on the second network. Thus, the first network device accesses the second network and can access resources on the second network.

Figure 4:
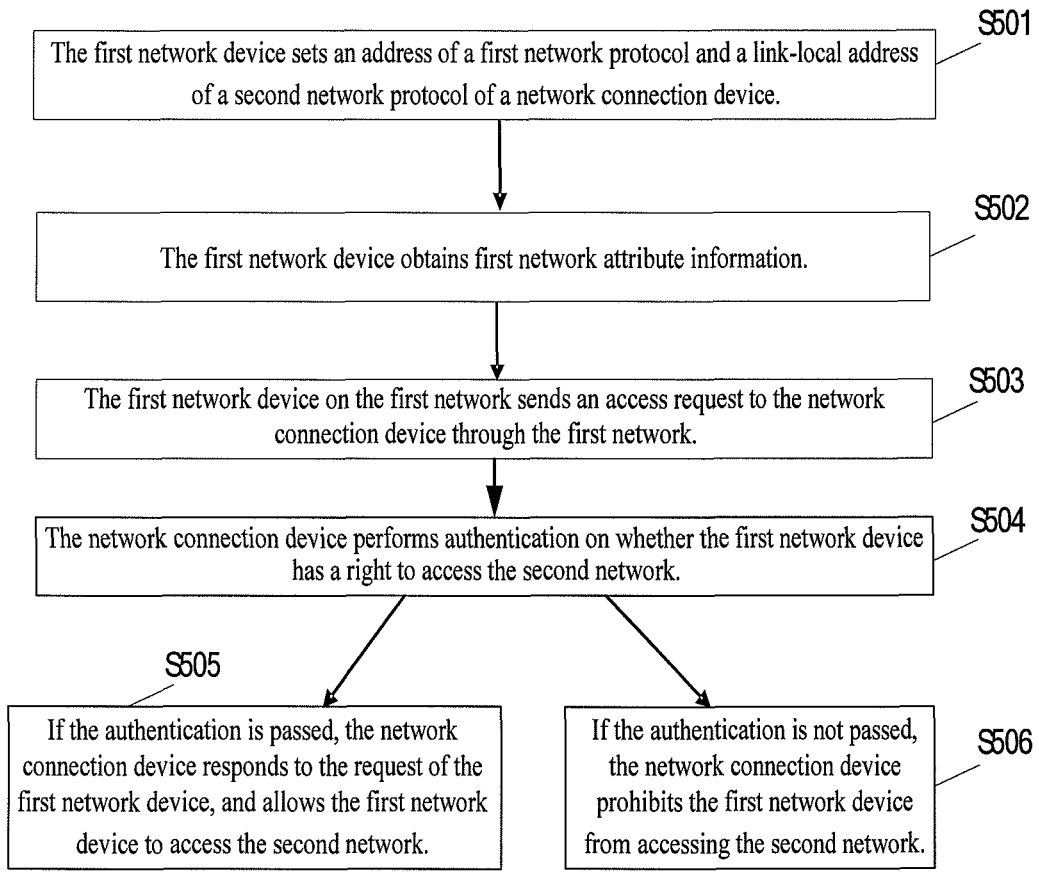
FIG. 4 is a schematic flow chart of a second implementation of the network access method according to the first embodiment of the present disclosure.

In Step S406, if the authentication is not passed, the network connection device prohibits the first network device from accessing the second network. FIG. 4 is a schematic flow chart of a second implementation of the network access method according to the first embodiment of the present disclosure.

In Step S501, the first network device sets an address of a first network protocol and a link-local address of a second network protocol of a network connection device.

Before sending a request to a network connection device, the first network device needs to obtain an address of the network connection device. To obtain the address of the network connection device, the first network device sets an address of a first network protocol of the network connection device and sets a link-local address of a second network protocol of the network connection device to be accessed according to the address of the first network protocol of the network connection device. The link-local address is used as a destination address of subsequent requests.

In Step S502, the first network device obtains first network attribute information.

After the first network device sets the address of the first network protocol of the network connection device and obtains the first network attribute information containing an identifier of the first network device (such as an IPV4 address), the first network attribute information can uniquely identify the first network device and is applicable to an authentication type and attributes of the network connection device.

In Step S503, the first network device on the first network sends an access request to the network connection device through the first network.

The first network device on the first network sends the access request to the network connection device according to the link-local of the second network protocol of the network connection device through the first network. The access request includes the first network attribute information containing the identifier of the first network device. The access request may be sent to the network connection device as a router request message.

In Step S504, the network connection device performs authentication on whether the first network device has a right to access the second network.

After receiving the access request, the network connection device extracts the first network attribute information containing the identifier of the first network device and performs authentication on whether the first network device has the right to access the second network according to the attribute information. The authentication methods include local authentication of the first network device or remote authentication through a remote authentication server. The network connection device connects the second network based on the second protocol and the first network based on the first protocol and may be a gateway or router for receiving the access request sent by the first network device and performing authentication on whether the first network device can access the second network. The network connection device then converts the attribute information into authentication types and attribute information that can be recognized locally or remotely according to the attribute information.

In Step S505, if the authentication is passed, the network connection device responds to the request of the first network device and allows the first network device to access the second network.

In Step S506, if the authentication is not passed, the network connection device prohibits the first network device from accessing the second network.

Figure 5:
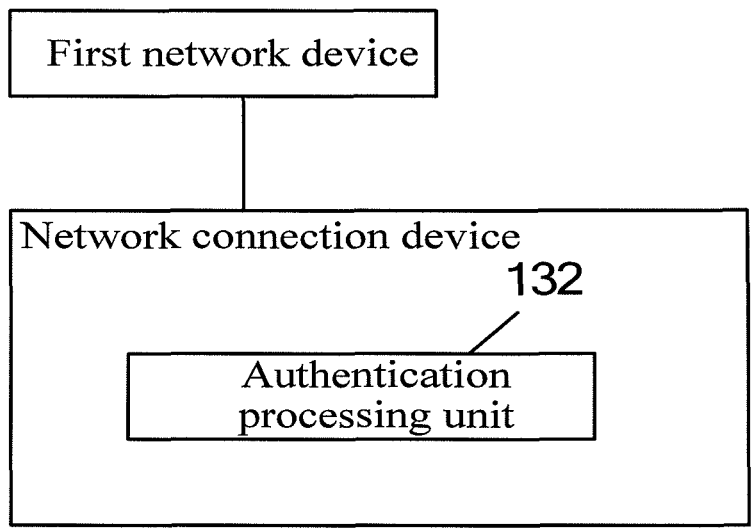
FIG. 5 is a schematic view of a network access system according to the first embodiment of the present disclosure.

Further, the present disclosure provides an embodiment of a network access system. FIG. 5 is a schematic view of a network access system according to the first embodiment of the present disclosure.

The network access system includes a first network device and a network connection device.

The first network device is disposed in a first network, and the first network is based on a first network protocol.

The network connection device connects a second network based on a second network protocol and the first network, and the first network device is connected to the network connection device through the first network. An authentication processing unit 132 is disposed in the network connection device.

After the network connection device receives the access request for accessing the second network from the first network device, the authentication processing unit 132 performs authentication on whether the first network device has a right to access the second network. If the authentication is passed, the first network device accesses the second network through the network connection device. If the authentication is not passed, the network connection device prohibits the first network device from accessing the second network.

Comparing the technical solutions of the embodiments and their implementations described above with the network system involving the ISATAP tunneling of FIG. 3, the first network may be corresponding to the IPv4 network, the second network may be corresponding to the IPv6 network, the network connection device may be corresponding to the ISATAP router, and the first network device may be corresponding to the IPv4/IPv6 host on the IPv4 network. Then, the embodiment of the network access method of the present disclosure will be described in detail as follows.

Figure 6:
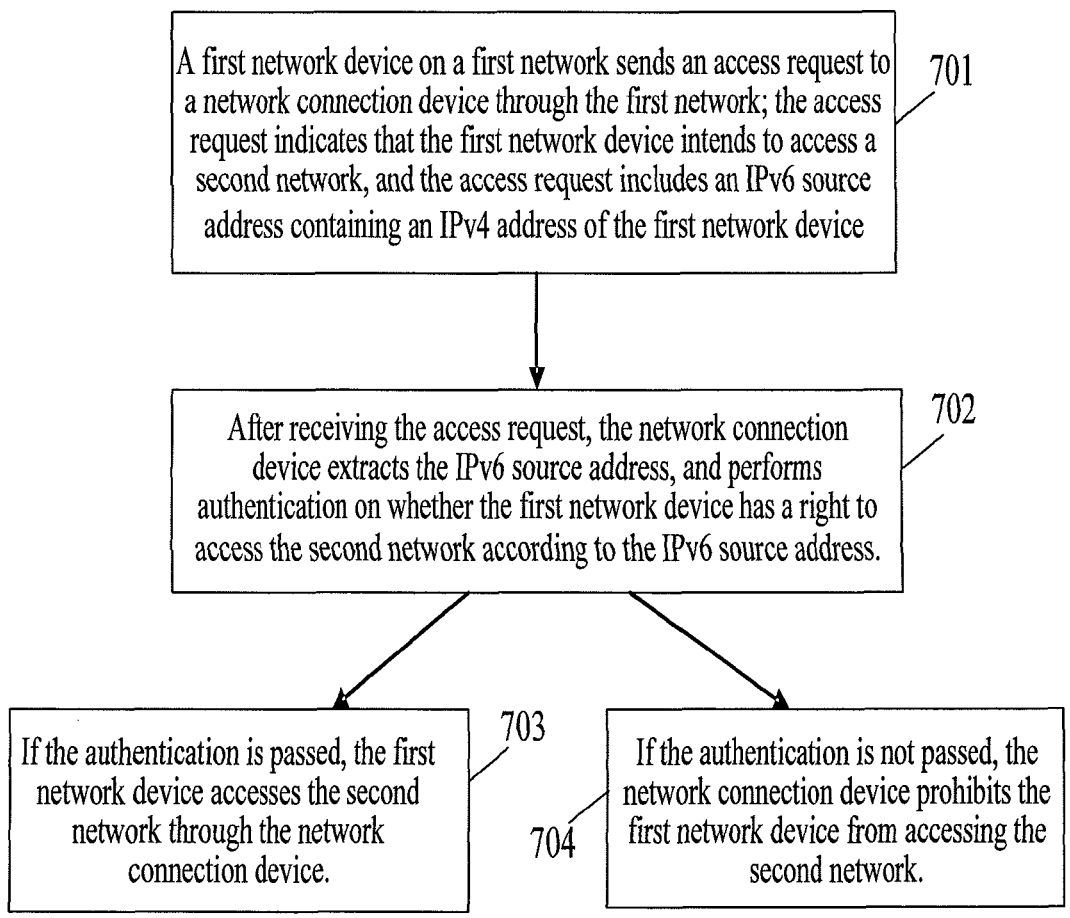
FIG. 6 is a flow chart of a method for network access between networks based on an IPv4 protocol and an IPv6 protocol according to a second embodiment of the present disclosure.

The present disclosure provides a second embodiment of the network access method. FIG. 6 shows the process of this network access method which includes the following steps.

In Step S701, a first network device on a first network sends an access request to a network connection device through the first network. The access request indicates that the first network device intends to access a second network, and the access request includes an IPv6 source address (IPv6 link-local address) containing an IPv4 address of the first network device.

In Step S702, after receiving the access request, the network connection device extracts the IPv6 source address and performs authentication on whether the first network device has a right to access the second network according to the IPv6 source address.

In Step S703, if the authentication is passed, the first network device accesses the second network through the network connection device.

In Step S704, if the authentication is not passed, the network connection device prohibits the first network device from accessing the second network.

The network connection device connects the second network based on the IPV6 protocol and the first network based on the IPV4 protocol, receives the access request sent by the first network device, and performs authentication on whether the first network device can access a gateway or router of the second network. Here, an ISATAP gateway is taken as an example to describe a process for implementing the network access.

Figure 7:
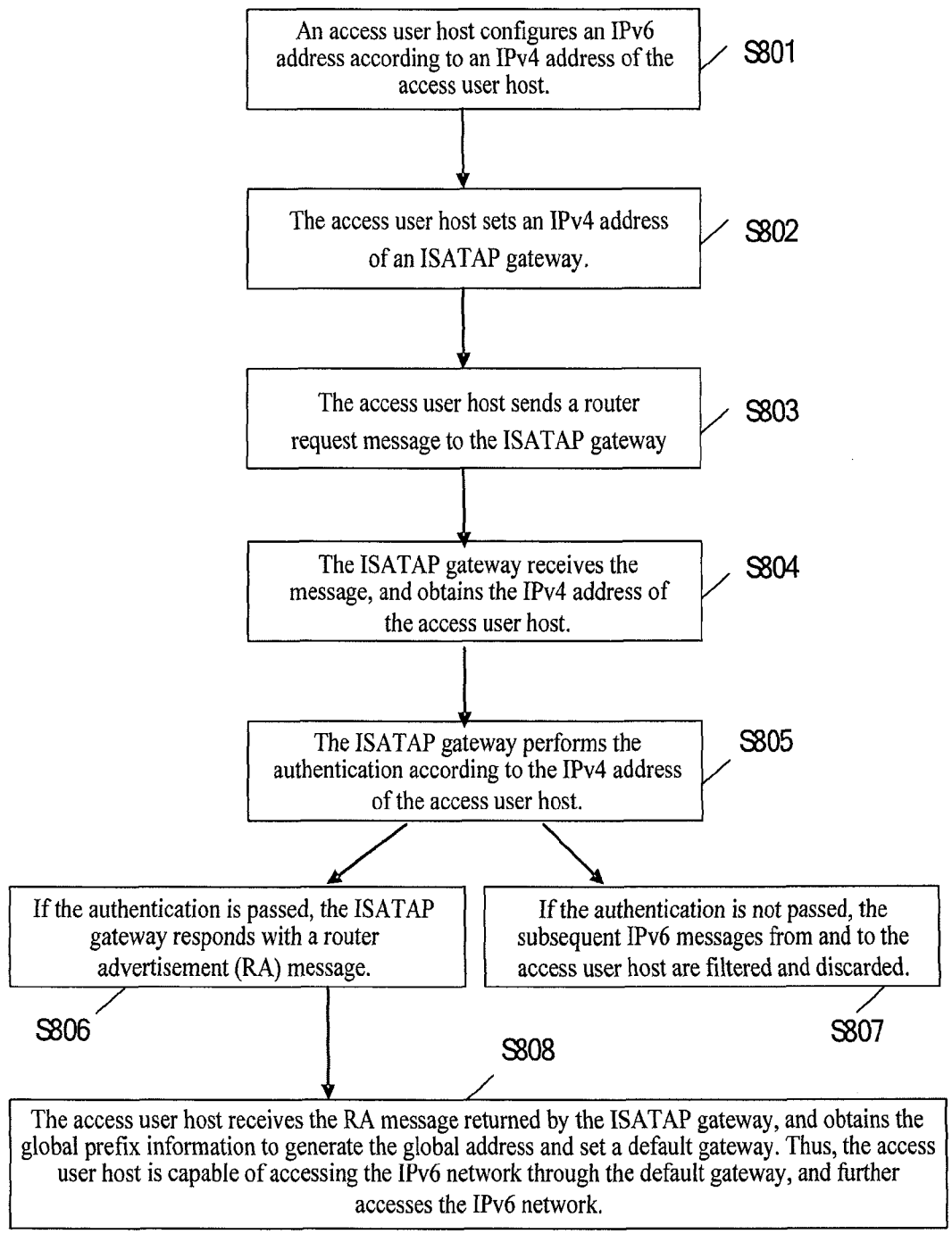
FIG. 7 is a schematic flow chart of an implementation of the method for network access between the networks based on the IPv4 protocol and the IPv6 protocol according to a second embodiment of the present disclosure.

FIG. 7 is a schematic flow chart of an implementation of a network access method according to a second embodiment of the present disclosure.

Through extension of the ISATAP gateway, when the ISATAP gateway processes an ISATAP tunnel access, the IPv6 link-local address containing the IPv4 address is set, and the ISATAP gateway extracts the IPv4 address of an access user and authenticates the user according to the IPv4 address. After the authentication is passed, the IPv6 global prefix information is obtained from the ISATAP through a Neighbor Discovery Protocol to realize the IPv6 access. The embodiment of the present disclosure may depend on the existing IPv4 authentication system to realize the authentication of the ISATAP tunnel accessing to the IPv6 network at a low cost, and to access the IPv6 network safely. Here, IPv4 address is equivalent to a link layer identifier, which uniquely identifies an access user. The authentication control based on the IPv4 address facilitates the deployment and operation of the access network. The implementation process is described as follows.

In Step S801, an access user host configures an IPv6 address according to an IPv4 address of the access user host.

The access user host manually configures or statelessly autoconfigures the IPv6 link-local address according to the principles of ISATAP tunnel access. The IPv6 link-local address has the following structure:

FE80::0000:5EFE:x.x.x.x, where FE80 is a 64-bit IPv6 structure identifier and x.x.x.x is a local IPv4 address of the access host.

In Step S802, the access user host sets an IPv4 address of the ISATAP gateway.

The access user host further sets the IPv4 address of the IPv6 ISATAP gateway to be y.y.y.y, and sets the IPv6 link-local address of the IPv6 ISATAP gateway according to the IPv4 address of the IPv6 ISATAP gateway. The IPv6 link-local address has the following structure:

FE80::0000:5EFE:y.y.y.y, where FE80 is a 64-bit IPv6 link-local address identifier and y.y.y.y is the IPv4 address of the IPv6 ISATAP gateway.

In Step S803, the access user host sends a router request message to the ISATAP gateway.

The access user host sends a router request message to the ISATAP gateway. The router request message is encapsulated in an IPv4 message and the request message is sent to the ISATAP router according to the IPv6 link-local address FE80::0000:5EFE:y.y.y.y of the ISATAP gateway.

In Step S804, the ISATAP gateway receives the message and obtains the IPv4 address of the access user host.

According to the ISATAP tunnel mechanism, the router request message reaches the ISATAP gateway through an ISATAP tunnel. At this time, the source address of the router request message is required to be the IPv6 link-local address of the access user host according to the ISATAP mechanism, that is, FE80::0000:5 EFE:x.x.x.x. After receiving the router request message, the ISATAP gateway obtains the IPv4 address of the access user host, that is, x.x.x.x, according to the source address FE80::0000:5EFE:x.x.x.x of the message.

In Step S805, the ISATAP gateway performs the authentication according to the IPv4 address of the access user host.

In Step S806, if the authentication is passed in Step S805, the ISATAP gateway responds with a router advertisement (RA) message. If the authentication is passed, and the IPv6 authentication control is realized, the ISATAP gateway responds with the RA message which includes the global address prefix information of the IPv6 network. Then, Step S808 is performed.

In Step S808, the access user host receives the RA message returned by the ISATAP gateway and obtains the global prefix information to generate the global address and set a default gateway. Thus, the access user host is capable of accessing the IPv6 network through the default gateway and further accesses the IPv6 network.

In Step S807, if the authentication is not passed in Step S805, the subsequent IPv6 messages from and to the access user host are filtered and discarded. The IPv6 messages received and sent through the ISATAP tunnel are checked. If the destination or source address of an IPv6 message contains the IPv4 address of the access user host, the message is discarded.

Figure 8:
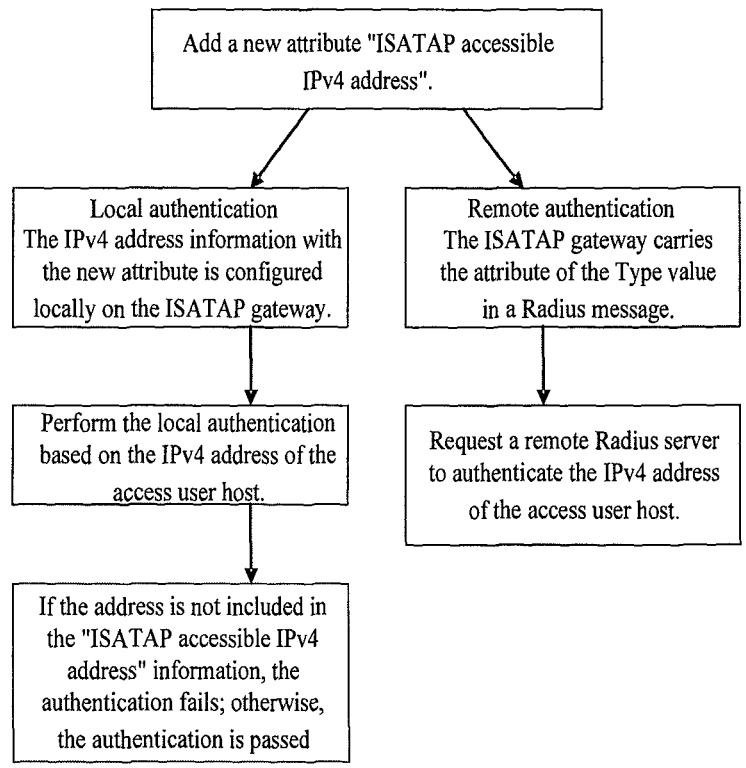
FIG. 8 shows a first specific example of Step S305 in the process of FIG. 7.

FIG. 8 shows a first specific example of Step S805 in the method of FIG. 7.

The ISATAP gateway provides a new AAA authentication means based on the existing AAA authentication mechanism which further includes the authentication to the IPv4 address type. The implementation process is described as follows.

In the process that the ISATAP gateway performs the authentication according to the IPv4 address of the access user gateway, a new AAA authentication means is provided which further includes the authentication to the IPv4 address type. According to this method, the existing AAA authentication is extended. The authentication is categorized into local authentication and remote authentication. The implementation of the two authentication modes is described as follows.

As for the local authentication, the attribute is extended, that is, a new attribute "ISATAP accessible IPv4 address", is added. The IPv4 address information of this attribute is configured locally on the ISATAP gateway before the authentication. In the authentication, the IPv4 address of the access user host may be used to perform the local authentication. The authentication process uses the existing AAA authentication mechanism. If the address is not included in the "ISATAP accessible IPv4 address" information, the authentication fails. Otherwise, the authentication is passed.

As for the remote authentication, the attribute is extended, that is, a new attribute is added. For example, a Type value is added to the Radius attribute. The Type value is corresponding to the "ISATAP accessible IPv4 address". In the authentication, the ISATAP gateway carries the Type value attribute in a Radius message and requests a remote Radius server to authenticate the IPv4 address of the access user host. The authentication process uses the existing AAA authentication process.

Figure 9:
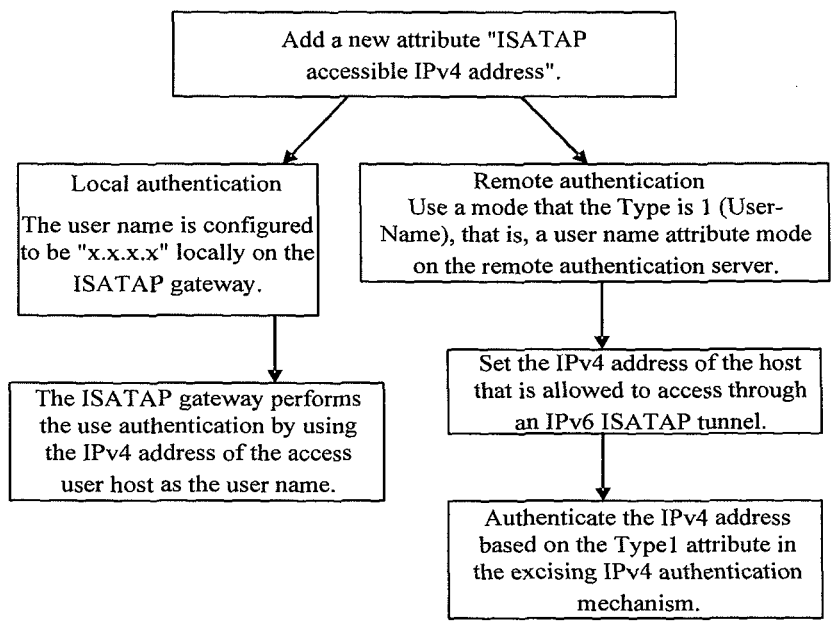
FIG. 9 shows a second specific example of Step S305 in the process of FIG. 7.

FIG. 9 shows a second example of Step S805 in the process of FIG. 7.

The ISATAP gateway performs the authentication according to the IPv4 address of the access user host. The authentication based on the existing authentication means based on the user name. Here, the IPv4 address is used as the user name which is used with a default user password to perform the authentication. Similarly, the authentication is also categorized into local authentication and remote authentication. The implementation process is described as follows.

In the local authentication mode, the user name is configured to be "x.x.x.x" locally on the ISATAP gateway. In the authentication of the ISATAP gateway, the existing authentication to the user name can be directly performed by using the IPv4 address of the access user host as the user name.

As for the remote authentication, for example, the Radius authentication, the IPv4 address of the host that is allowed to access through an IPv6 ISATAP tunnel is set on a remote authentication server in a mode that the Type is 1 (User-Name), that is, a user name attribute mode. Thus, the IPv4 address can be authenticated based on the Type1 attribute in the excising IPv4 authentication mechanism so no upgrade is required.

Figure 10:
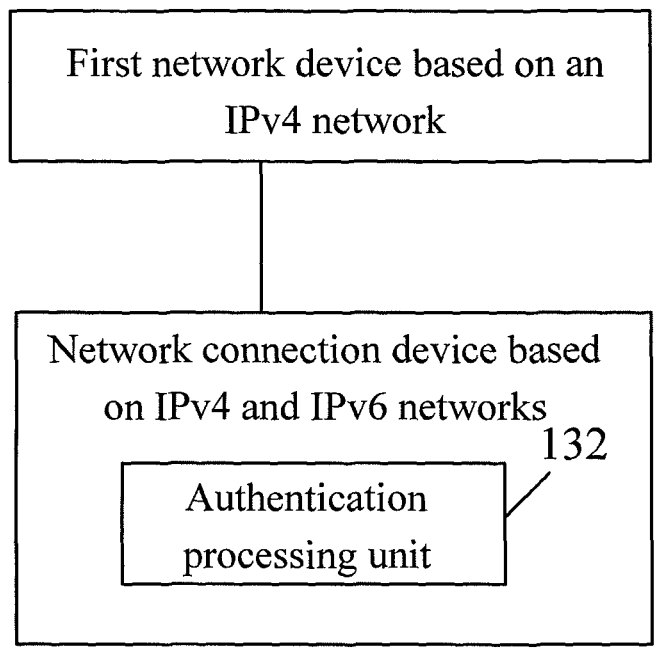
FIG. 10 is a schematic view of a system for network access between the networks based on the IPv4 protocol and the IPv6 protocol according to a second embodiment of the present disclosure.

The previous two methods are specific implementations that the ISATAP gateway performs the authentication according to the IPv4 address of the access user host. However, the authentication process is not limited to the previous implementations. Further, the present disclosure also provides a second embodiment of a network access system. FIG. 10 is a schematic view of a system for network access between the networks based on the IPv4 protocol and the IPv6 protocol network according to the second embodiment of the present disclosure.

The network access system includes a first network device and a network connection device.

The first network device is disposed on a first network based on the IPv4 protocol.

The network connection device connects a second network based on the IPv6 protocol and the first network, and the first network device is connected to the network connection device through the first network. An authentication processing unit is disposed in the network connection device.

When the network connection device receives an access request includes a source address containing an IPv4 address of the first network device from the first network device, the network connection device extracts and obtains the source address. The authentication processing unit performs authentication on whether the first network device has a right to access the second network according to the source address. If the authentication is passed, the first network device accesses the second network through the network connection device. If the authentication is not passed, the network connection device prohibits the first network device from accessing the second network.

It is known from the previous description that the embodiment of the present disclosure does not need an authentication server in the IPv4 network and does not need to upgrade a network authentication server to support the authentication system of the network to be accessed. Thus, the network access cost is reduced effectively, limitations to the networking are not added, and the existing services and users of the network to be accessed are not impacted. The authentication and access to the network is realized at a low cost to facilitate the deployment and operation of the network access solution. In addition, as it is unnecessary to assign the IPv6 network global addresses to the users before authentication, the potential risks to the security of the access network are reduced.

Figure 11:
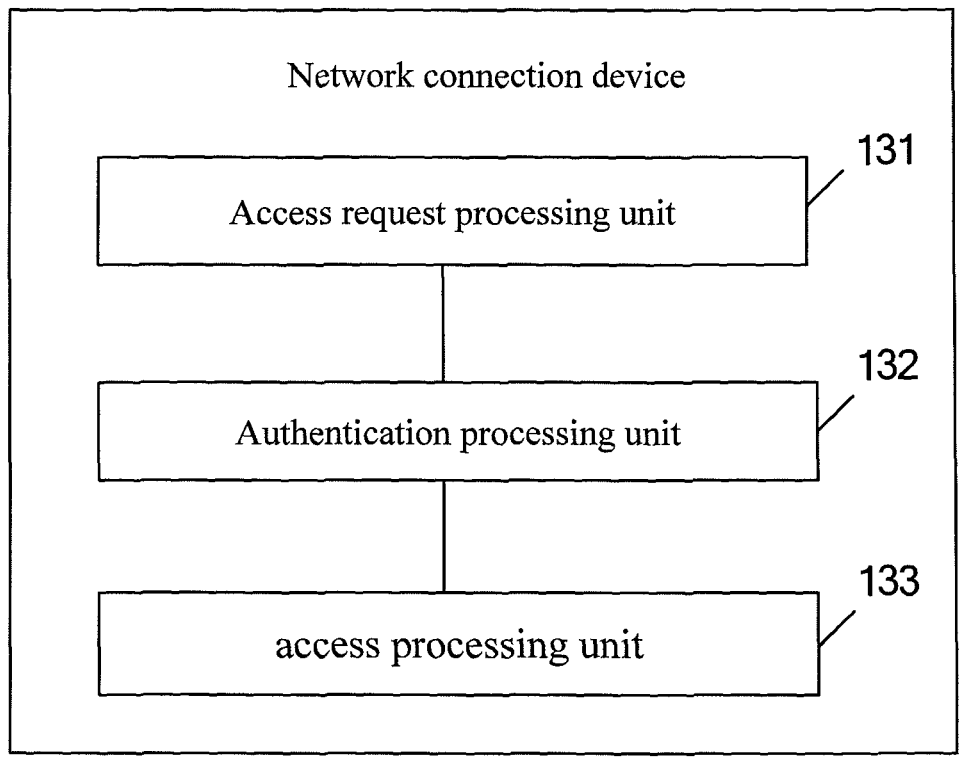
FIG. 11 is a schematic structural view of a network connection device according to an embodiment of the present disclosure.

Software corresponding to the network access method disclosed previously may be recorded in a readable storage medium which may be an optical, semiconductor, or other storage medium. The present disclosure also discloses a network connection device. FIG. 11 is a schematic structural view of a network connection device according to an embodiment of the present disclosure. Referring to FIG. 11, the network connection device of this embodiment is connected between a first network and a second network and includes an access request processing unit 131, an authentication processing unit 132, and an access processing unit 133. The internal structure and the operating principles of the network connection device are described as follows in more detail.

When a first network device on the first network needs to access the second network, the first network device sends an access request to the network connection device of this embodiment through the first network. The access request indicates that the first network device requests to access the second network. The network connection device of this embodiment receives the access request and, the access request processing unit 131 processes the access request. In particular, a first network attribute information about the first network device is obtained based on the access request. Preferably, the access request includes a link-local address of the second network containing an address of the first network protocol of the first network device. Then, the access request processing unit 131 extracts the address of the first network protocol of the first network device from the access request, and the address of the first network protocol is the first network attribute information of the first network device.

Next, based on the first network attribute information of the first network device provided by the access request processing unit 131, the authentication processing unit 132 performs authentication on whether the first network device has a right to access the second network. In particular, the authentication processing unit 132 may be a local authentication processing unit which locally performs authentication on whether the first network device has the right to access the second network based on the first network attribute information. The authentication processing unit 132 may also be a remote authentication processing unit which remotely performs authentication on whether the first network device has the right to access the second network based on the first network attribute information through a remote authentication server.

Finally, when an authentication result provided by the authentication processing unit 132 indicates that the authentication is passed, the access processing unit 133 connects the first network device into the second network. When the authentication result indicates that the authentication is not passed, the access processing unit 133 prohibits the first network device from accessing the second network. As described above, the network connection device includes, but not limited to, a gateway or router. The first network and the second network are based on different network protocols, for example, the first network is based on the IPv4 protocol, and the second network is based on the IPv6 protocol.

Based on the network connection device disclosed previously, the present disclosure also provides a third embodiment of the network access system. In this embodiment, the network access system includes a first network, a second network, and a network connection device connected between the first network and the second network. The details of the network connection device are as shown in FIG. 11 and will not be repeated here.

It is known from the previous embodiments that by extending the ISATAP gateway (the network connector), after receiving the access request for accessing the IPv6 network from the first network device on the IPv4 network, the IPv4 network attribute information is obtained based on the access request, the first network device is authenticated according to the IPv4 network attribute information, and the first network device is allowed to access the IPv6 after the authentication is passed. As the ISATAP gateway according to the embodiments of the present disclosure performs the authentication based on the IPv4 network attribute information (for example, the IPv4 address) of the first network device instead of the IPv6 network attribute information (for example, the global address of the IPv6 network protocol of the prior art), before the authentication is passed, the user cannot obtain the global address of the IPv6 network protocol. If the authentication fails, the ISATAP gateway will not respond with the RA message, and the access user host cannot obtain the information about the valid IPv6 global address. Thus, the IPv6 access of the user is limited, and the potential risks to the security of the network access are reduced.

In another aspect, the network connection device can perform the authentication locally by itself so it is unnecessary to set a Portal authentication server on the IPv4 network. Thus, limitations to the networking are not added, and the existing users who use only the IPv4 services are not impacted. The network connection device may also perform the remote authentication by using the existing IPv4 authentication server so as to realize the authentication of the IPv6 ISATAP tunnel access at a low cost to facilitate the deployment and operation of the IPv6 ISATAP tunnel access solution. The existing IPv4 authentication system, including the authentication server, does not need to be upgraded to the IPv6 to support the IPv6 authentication so the deployment cost is lowered.

Apparently, persons skilled in the art can make modifications and variations to the present disclosure without departing from the spirit and scope of the present disclosure. The present disclosure intends to cover these modifications and variations as long as they fall into the scope of the claims of the present disclosure and the equivalent technology thereof.

What is claimed is:

1. A network access method, comprising:
obtaining, by a network connection device connected between an Internet Protocol version 4 (IPv4) network and an Internet Protocol version 6 (IPv6) network, IPv4 network attribute information about an IPv4 network device according to an access request for accessing the IPv6 network from the IPv4 network device,
wherein the IPv4 network attribute information comprises an IPv4 address of the IPv4 network device and the access request comprises an IPv6 link-local address containing the IPv4 address of the IPv4 network device, the obtaining further comprising extracting, by the network connection device, the IPv4 address of the IPv4 network device from the access request;
performing authentication, by the network connection device, on whether the IPv4 network device has a right to access the IPv6 network by authenticating the IPv4 network attribute information;
connecting, by the network connection device, the IPv4 network device into the IPv6 network when the authentication is passed; and
prohibiting, by the network connection device, the IPv4 network device from accessing the IPv6 network when the authentication is not passed.

2. The method according to claim 1, wherein the performing authentication, by the network connection device, on whether the IPv4 network device has the right to access the IPv6 network comprises:
performing authentication, by the network connection device, on whether the first IPv4 network device has the right to access the IPv6 network locally.

3. The method according to claim 2, wherein the authenticating the IPV4 address comprises:
adding the IPv4 address of the IPv4 network device into attribute information of an authentication type to be authenticated by the network connection device;
performing authentication, by the network connection device, on whether the IPv4 network device has the right to access the IPv6 network by authenticating the attribute information of the authentication type.

4. The method according to claim 2, wherein the authenticating the IPv4 address comprises:

configuring user name attribute information on the network connection device; and authenticating, by the network connection device, the IPv4 address of the IPv4 network device by authenticating the user name, wherein the user name attribute information comprises the IPv4 address of the IPv4 network device.

5. The method according to claim 1, wherein the connecting, by the network connection device, the IPv4 network device into the IPv6 network comprises:

responding, by the network connection device, prefix information about an IPv6 global address to the IPv4 network device;

generating, by the IPv4 network device, an IPv6 global address of the IPv4 network device based on the prefix information; and using, by the IPv4 network device, the IPv6 global address to access the IPv6 network through the network connection device.

6. The method according to claim 1, wherein the network connection device is a gateway or a router.

7. The method according to claim 1, wherein the performing authentication, by the network connection device, on whether the IPv4 network device has the right to access the IPv6 network comprises:

performing authentication on whether the IPv4 network device has the right to access the IPv6 network remotely through a remote authentication server.

8. The method according to claim 7, wherein the authenticating the IPV4 address comprises:

adding the IPv4 address of the IPv4 network device into attribute information of an authentication type to be authenticated by the remote authentication server; and requesting the remote authentication server to perform authentication on whether the IPV4 network device has the right to access the IPV6 network by authenticating the attribute information of the authentication type.

9. The method according to claim 7, wherein the authenticating the IPv4 address comprises:

configuring user name attribute information on the remote authentication server; and authenticating, by the remote authentication server, the IPv4 address of the first network device by authenticating the user name, wherein the user name attribute information comprises the IPv4 address of the IPV4 network device.

10. The method according to claim 1, wherein the access request for accessing the IPv6 network from the IPv4 network device is transmitted to the network connection device through an ISATAP tunnel on the IPv4 network.

11. A network connection device, connected between an Internet Protocol version 4 (IPv4) network and an Internet Protocol version 6 (IPv6) network, comprising:

an access request processing unit configured to obtain IPv4 network attribute information about an IPv4 network device based on an access request for accessing the IPv6 network from the IPv4 network device, wherein the IPv4 network attribute information comprises an IPv4 address of the IPv4 network device and the access request comprises an IPv6 link-local address containing the IPv4 address of the IPv4 network device, the access request processing unit further configured to extract the IPv4 address of the IPv4 network device from the access request;

an authentication processing unit configured to perform authentication on whether the IPv4 network device has a right to access the IPv6 network by authenticating the IPv4 network attribute information provided by the access request processing unit; and an access processing unit configured to connect the IPv4 network device into the IPv6 network when an authentication result provided by the authentication processing unit indicates that the authentication is passed; and to prohibit the IPv4 network device from accessing the IPv6 network when the authentication result indicates that the authentication is not passed.

12. The device according to claim 11, wherein, the authentication processing unit is a local authentication processing unit and is configured to perform authentication on whether the IPv4 network device has the right to access the IPv6 network locally by authenticating the IPv4 network attribute information provided by the access request processing unit.

13. The device according to claim 11, wherein the network connection device is a gateway or a router.

14. The device according to claim 11, wherein the authentication processing unit is a remote authentication processing unit and is configured to perform authentication on whether the IPv4 network device has the right to access the IPv6 network remotely through a remote authentication server by authenticating the IPv4 network attribute information provided by the access request processing unit.

15. A network access system, comprising an Internet Protocol version 4 (IPv4) network, an Internet Protocol version 6 (IPv6) network, and a network connection device connected between the IPv4 network and the IPv6 network, wherein the network connection device comprises:

an access request processing unit configured to obtain IPv4 network attribute information about an IPv4 network device based on an access request for accessing the IPv6 network from the IPv4 network device, wherein the IPv4 network attribute information comprises an IPv4 address of the IPv4 network device and the access request comprises an IPv6 link-local address containing the IPv4 address of the IPv4 network device, the access request processing unit further configured to extract the IPv4 address of the IPv4 network device from the access request;

an authentication processing unit configured to perform authentication on whether the IPv4 network device has a right to access the IPv6 network by authenticating the IPv4 network attribute information provided by the access request processing unit; and an access processing unit configured to connect the IPv4 network device into the IPv6 network when an authentication result provided by the authentication processing unit indicates that the authentication is passed; and to prohibit the IPv4 network device from accessing the IPv6 network when the authentication result indicates that the authentication is not passed.

16. A network access system, comprising an Internet Protocol version 4 (IPv4) network device disposed in an IPv4 network;

a network connection device connecting an Internet Protocol version 6 (IPv6) network and the IPv4 network, wherein the IPv4 network device is connected to the network connection device through the IPv4 network;

an access request processing unit is disposed in the network connection device, wherein the access request processing unit obtains IPv4 network attribute information about the IPv4 network device based on an access request for accessing the IPv6 network from the IPv4 network device, wherein the IPv4 network attribute information comprises an IPv4 address of the IPv4 network device and the access request comprises an IPv6 link-local address containing the IPv4 address of the IPv4 network device, and the access request processing unit further extracts the IPv4 address of the IPv4 network device from the access request; and an authentication processing unit is disposed in the network connection device, wherein after the network connection device receives the access request for accessing the IPv6 network from the IPv4 network device, the authentication processing unit performs authentication on whether the IPv4 network device has a right to access the IPv6 network by authenticating the IPv4 network attribute information, where when the authentication is passed, the IPv4 network device accesses the IPv6 network through the network connection device; and when the authentication is not passed, the network connection device prohibits the IPv4 network device from accessing the IPv6 network.

17. A network access system, comprising an Internet Protocol version 4 (IPv4) network device disposed in an IPv4 network;

a network connection device connecting an Internet Protocol version 6 (IPv6) network and the IPv4 network, wherein the IPv4 network device is connected to the network connection device through the IPv4 network; and an authentication processing unit is disposed in the network connection device, wherein after the network connection device receives an access request for accessing the IPv6 network from the IPv4 network device, the access request comprising an IPv6 link-local address containing an IPv4 address of the IPv4 network device, the network connection device extracts and obtains the IPv4 address of the IPv4 network device from the access request and the authentication processing unit performs authentication on whether the IPv4 network device has a right to access the IPv6 network according to the IPv4 address; where when the authentication is passed, the IPv4 network device accesses the IPv6 network through the network connection device; and when the authentication is not passed, the network connection device prohibits the IPv4 network device from accessing the IPv6 network.

* * * * *